US006473903B2

(12) United States Patent
Balakrishnan et al.

(10) Patent No.: US 6,473,903 B2
(45) Date of Patent: *Oct. 29, 2002

(54) METHOD AND SYSTEM FOR IMPLEMENTING INTERACTIVE BROADCAST PROGRAMS AND COMMERCIALS

(75) Inventors: Mahesh Balakrishnan, Briarcliff Manor, NY (US); Prerana Vaidya, Briarcliff Manor, NY (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 08/774,767

(22) Filed: Dec. 30, 1996

(65) Prior Publication Data

US 2001/0052135 A1 Dec. 13, 2001

(51) Int. Cl.[7] .......................... H04N 5/50; H04N 7/173; H04N 7/10
(52) U.S. Cl. .................. 725/135; 725/37; 725/112; 725/113; 725/139
(58) Field of Search ........................... 348/1, 3, 12, 13, 348/563, 565, 9; 725/37–142

(56) References Cited

U.S. PATENT DOCUMENTS

| 4,264,925 | A | * | 4/1981 | Freeman et al. ............. 358/86 |
| 4,602,279 | A | | 7/1986 | Freeman |
| 5,155,591 | A | * | 10/1992 | Wachob ..................... 455/6.2 |

(List continued on next page.)

FOREIGN PATENT DOCUMENTS

WO 9528794 10/1995

OTHER PUBLICATIONS

"Statistical Multiplexing of Multiple MPEG–2 Video Programs in a Single Channel", Mike Perkins and David Arnstein, SMPTE Journal, Sep. 1995.

*Primary Examiner*—Andrew Faile
*Assistant Examiner*—Reuben M. Brown
(74) *Attorney, Agent, or Firm*—Russell Gross

(57) ABSTRACT

A system for implementing an interactive broadcast program which includes a transmitter for transmitting a multiplexed data stream which includes a main program and a plurality of different commercials, and a receiver (e.g., a digital television receiver) configured to receive the multiplexed data stream. The receiver includes a display device (e.g., a television monitor) and, facilities responsive to a user action for causing the display device to display a selected one of the plurality of different commercials during a commercial interruption in the main program. Also disclosed is a system for implementing an interactive broadcast program which includes a transmitter for transmitting a multiplexed data stream which includes an interactive main program comprised of a plurality of main program segments including at least a first main program segment and a plurality of different second main program segments, and a receiver. The receiver (e.g., an analog television receiver equipped with a digital set-top box) includes a display device (e.g., a CRT), and facilities responsive to a user action for causing the display device to branch to a selected one of the plurality of different second main program segments at a branching point of the first main program segment.

34 Claims, 3 Drawing Sheets

U.S. PATENT DOCUMENTS

| | | | | |
|---|---|---|---|---|
| 5,231,494 A | * | 7/1993 | Wachob | 348/10 |
| 5,410,344 A | * | 4/1995 | Graves et al. | 348/1 |
| 5,424,770 A | | 6/1995 | Schmelzer et al. | |
| 5,493,339 A | * | 2/1996 | Birch et al. | 348/461 |
| 5,528,304 A | * | 6/1996 | Cherrick et al. | 348/563 |
| 5,532,735 A | | 7/1996 | Blahut et al. | |
| 5,537,152 A | * | 7/1996 | Ishikawa | 348/564 |
| 5,537,153 A | * | 7/1996 | Shigihara | 348/564 |
| 5,541,662 A | * | 7/1996 | Adams et al. | 725/136 |
| 5,585,858 A | * | 12/1996 | Harper et al. | 348/485 |
| 5,592,551 A | * | 1/1997 | Lett et al. | 380/20 |
| 5,600,365 A | * | 2/1997 | Kondo et al. | 348/385 |
| 5,600,366 A | * | 2/1997 | Schulman | 348/9 |
| 5,621,456 A | * | 4/1997 | Florin et al. | 348/7 |
| 5,661,516 A | * | 8/1997 | Carles | 725/35 |
| 5,663,757 A | * | 9/1997 | Morales | 348/13 |
| 5,724,091 A | * | 3/1998 | Freeman et al. | 348/13 |
| 5,758,258 A | * | 5/1998 | Shoff et al. | 455/5.1 |
| 5,758,259 A | * | 5/1998 | Lawler | 455/5.1 |
| 5,774,666 A | * | 6/1998 | Portuesi | 709/218 |
| 5,781,228 A | * | 7/1998 | Sposato | 348/7 |
| 5,801,753 A | * | 9/1998 | Eyer et al. | 348/906 |
| 5,805,220 A | * | 9/1998 | Kessman et al. | 348/385 |
| 5,818,441 A | * | 10/1998 | Throckmorton et al. | 725/110 |
| 5,894,320 A | * | 4/1999 | Vancelette | 348/7 |
| 5,903,314 A | * | 5/1999 | Niijima et al. | 348/564 |
| 5,929,849 A | * | 7/1999 | Kikinis | 345/327 |
| 5,940,073 A | * | 8/1999 | Klosterman et al. | 348/7 |
| 6,256,785 B1 | * | 7/2001 | Klappert et al. | 725/136 |
| 6,275,989 B1 | * | 8/2001 | Broadwin et al. | 725/37 |

* cited by examiner

METHOD AND SYSTEM FOR IMPLEMENTING INTERACTIVE BROADCAST PROGRAMS AND COMMERCIALS

BACKGROUND OF THE INVENTION

The present invention relates generally to systems for broadcasting multimedia information, such as terrestrial, cable, and satellite television broadcast systems, and more particularly, to a method and system for implementing interactive broadcast programs and commercials.

Conventional television broadcast systems simply broadcast predetermined commercials during regularly scheduled commercial breaks in regularly scheduled television programs transmitted on a given broadcast channel. As such, the present television broadcast systems are entirely passive, in the sense that they do not give the viewer any choice with respect to the content of the television program and/or commericals received on a given channel. The only options the viewer has are to watch the program being delivered, switch channels, or turn the television off. Further, all viewers which receive a television program broadcast over a given broadcast channel will view the same commercials.

U.S. Pat. No. 5,515,098, issued to Carles, discloses a device and method for distributing different commercials to different subscribers in a so-called "video on-demand" system. In this system, commercials can be targeted to specific households which the advertisers determine to be part of their "target market" for the particular product or service being advertised, e.g., based upon demographic and other information which is compiled in a subscriber database. While the Carles system provides a certain level of flexibility and choice to the broadcasters and advertisers as to the commercials which are delivered to the end-users, this system still does not provide the end-user (consumer) with any choice with respect to the content of the television program and/or commericals received on a given channel. Moreover, the Carles system is limited in its applicability to a commmunications network in which individual subscriber units connected to a central server are individually addressable, e.g., a video on-demand network.

Based on the above and foregoing, it can be appreciated that there presently exists a need in the art for a broadcast television system which is interactive (rather than passive), in the sense of enabling the end-user (consumer) to choose between two or more viewing options with respect to the program material being broadcast over a given broadcast channel. The present invention fulfills this need in the art.

SUMMARY OF THE INVENTION

The present invention, in one of its aspects, encompasses a system for implementing an interactive broadcast program, which includes a transmitter for transmitting a multiplexed data stream which includes a main program and a plurality of different commercials, and a receiver (e.g., a digital television receiver) configured to receive the multiplexed data stream. The receiver includes a display device (e.g., a television monitor) and, facilities responsive to a user action for causing the display device to display a selected one of the plurality of different commercials during a commercial interruption in the main program.

The facilities responsive to a user action preferably include a digital signal processor for processing the multiplexed data stream in such a manner as to cause the display device to simultaneously display a plurality of multimedia hotspots indicative of respective ones of the plurality of different commercials during commercial interruptions in the main program, and a user-operated control device for enabling a user to choose a selected one of the displayed multimedia hotspots by means of the user action, to thereby cause the corresponding commercial to be displayed by the display device, e.g., by means of pointing and clicking on the selected one of the displayed multimedia hotspots corresponding to the selected commercial.

The present invention, in another of its aspects, encompasses a system for implementing an interactive broadcast program, which includes a transmitter for transmitting a multiplexed data stream which includes an interactive main program comprised of a plurality of main program segments including at least a first main program segment and a plurality of different second main program segments, and a receiver. The receiver (e.g., an analog television receiver equipped with a digital set-top box) includes a display device (e.g., a CRT), and facilities responsive to a user action for causing the display device to branch to a selected one of the plurality of different second main program segments at a branching point of the first main program segment.

The facilities responsive to a user action preferably include a digital signal processor for processing the multiplexed data stream in such a manner as to cause the display device to simultaneously display a plurality of multimedia hotspots indicative of respective ones of the plurality of different second main program segments at a branching point of the first main program segment, and a user-operated control device for enabling a user to choose a selected one of the displayed multimedia hotspots by means of the user action, to thereby cause the program to branch to the selected second main program segment, e.g., by means of pointing and clicking on the selected one of the displayed multimedia hotspots corresponding to the selected second main program segment.

The present invention, in another of its aspects, encompasses a method for implementing an interactive program, which includes the steps of transmitting a multiplexed data stream which includes a main program and a plurality of different commercials, receiving the multiplexed data stream, and displaying a selected one of the plurality of different commercials during a commercial interruption in the main program in response to a user action.

The present invention, in another of its aspects, encompasses a method for implementing an interactive program, which includes the steps of transmitting a multiplexed data stream which includes an interactive main program comprised of a plurality of main program segments including at least a first main program segment and a plurality of different second main program segments, receiving said multiplexed data stream, and branching to a selected one of the plurality of different second main program segments at a branching point of the first main program segment in response to a user action.

The present invention, in yet other of its aspects, encompasses a transmitter, a receiver, and a multiplexed data stream which facilitate various facets of the above-described method and system of the present invention.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize modifications and additional applications and embodiments within the scope thereof and additional fields in which the present invention would be of significant utility.

In a presently preferred embodiment, the present invention is implemented utilizing a digital video receiver, e.g., an ATV or HDTV receiver, which includes an MPEG or ATSC decoder for decoding a broadcast digital video data stream, e.g., an MPEG or ATSC digital video data stream, and a digital-to-analog converter (DAC) for converting the decoded digital video data stream into an analog television signal for driving a CRT or other display device/monitor. The software (application program) for implementing the method of the present invention can suitably be resident in the digital video receiver or transmitted in the downstream (broadcast) channel and downloaded into the digital video receiver at start-up or channel-change time. To facilitate greater ease of description of the present invention, the term "main program" will be employed hereinafter to refer to the primary program of interest to the television viewer. In this connection, in a typical television program, the television show or movie will be the main program, with the commercials being broadcast during interruptions or commerical breaks in the main program.

In accordance with a first preferred embodiment of the method of the present invention, at the time of a commercial break in the main program being broadcast over the broadcast channel which is currently selected by the viewer, a choice (or menu) of different commercials which are available to the viewer will be displayed. For example, several different logos or video sequences can be displayed on different portions or spatial locations of the display area of the television screen. The logos or video sequences are representative or indicative of the different products and/or services and/or companies corresponding to the different commercials which are available for display. These logos or video sequences will hereinafter be referred to as "multimedia hotspots". The display of the different multimedia hotspots can be thought of as a "mosaic picture", with each of the multimedia hotspots constituting a respective "sub-picture".

Figure 1:
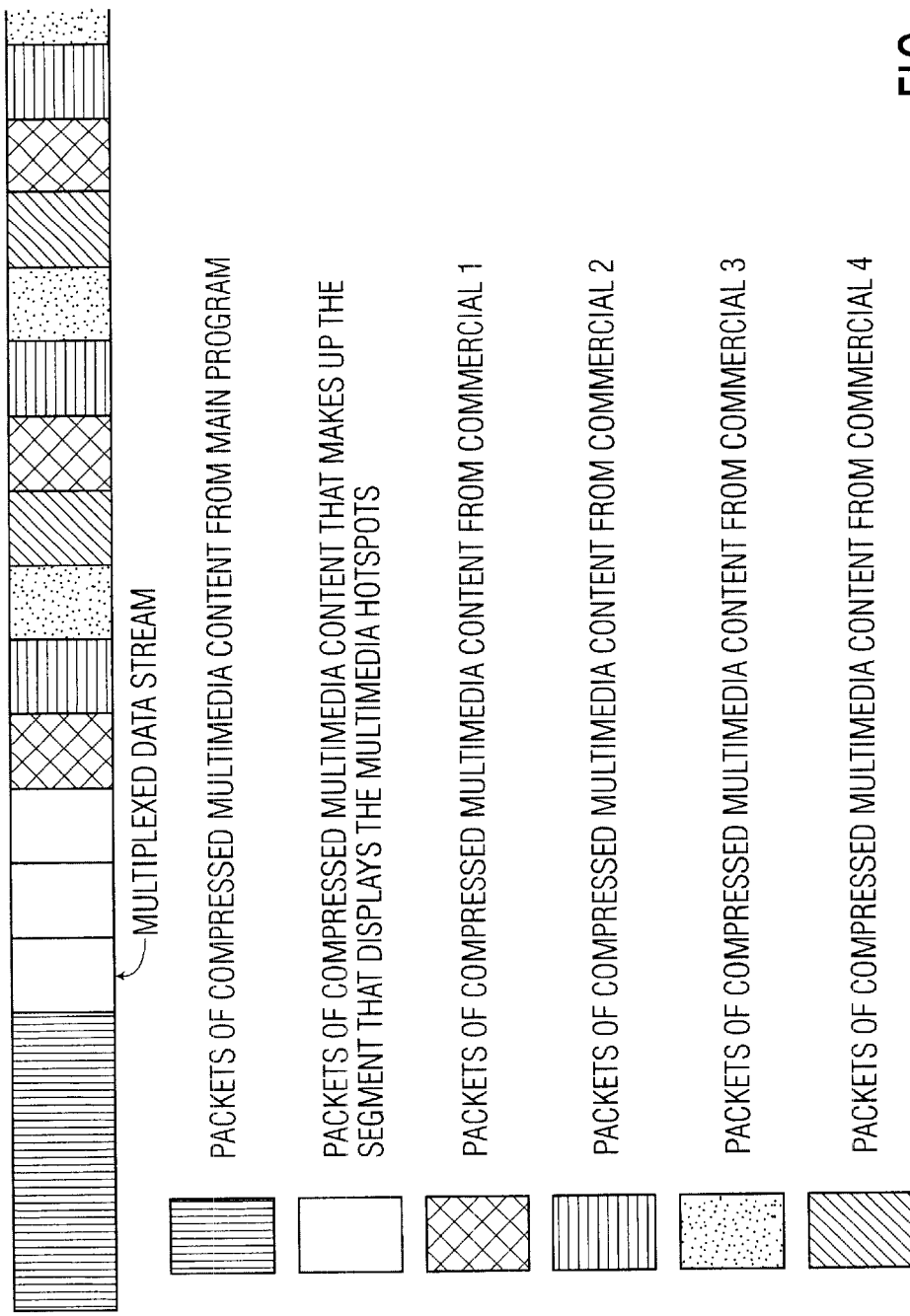
FIG. 1 is a diagram which depicts a multiplexed data stream according to a first preferred embodiment of the present invention.

With reference now to FIG. 1, in accordance with the first preferred embodiment of the present invention, the different commercials are preferably transmitted over the broadcast channel as a multiplexed stream of packets of compressed multimedia content corresponding to the different commercials, along with the packets of compressed multimedia content comprising the main program, and the packets of multimedia content that together comprise the video segment that displays the menu of multimedia hotspots.

The viewer can suitably use a remote control unit (RCU) or other user control device (e.g., programmable keypad) to select the commercial he/she desires to view, e.g., by moving a cursor ("pointing") and clicking on the multimedia hotspot that represents the commercial he/she desires to view, or by entering a program number corresponding to the position of the multimedia hotspot that represents the commercial he/she desires to view. The application program could be written to force the display of a default commercial in the event the viewer does not select any commercial within a predetermined default period of time (e.g., 15–30 seconds).

Figure 2:
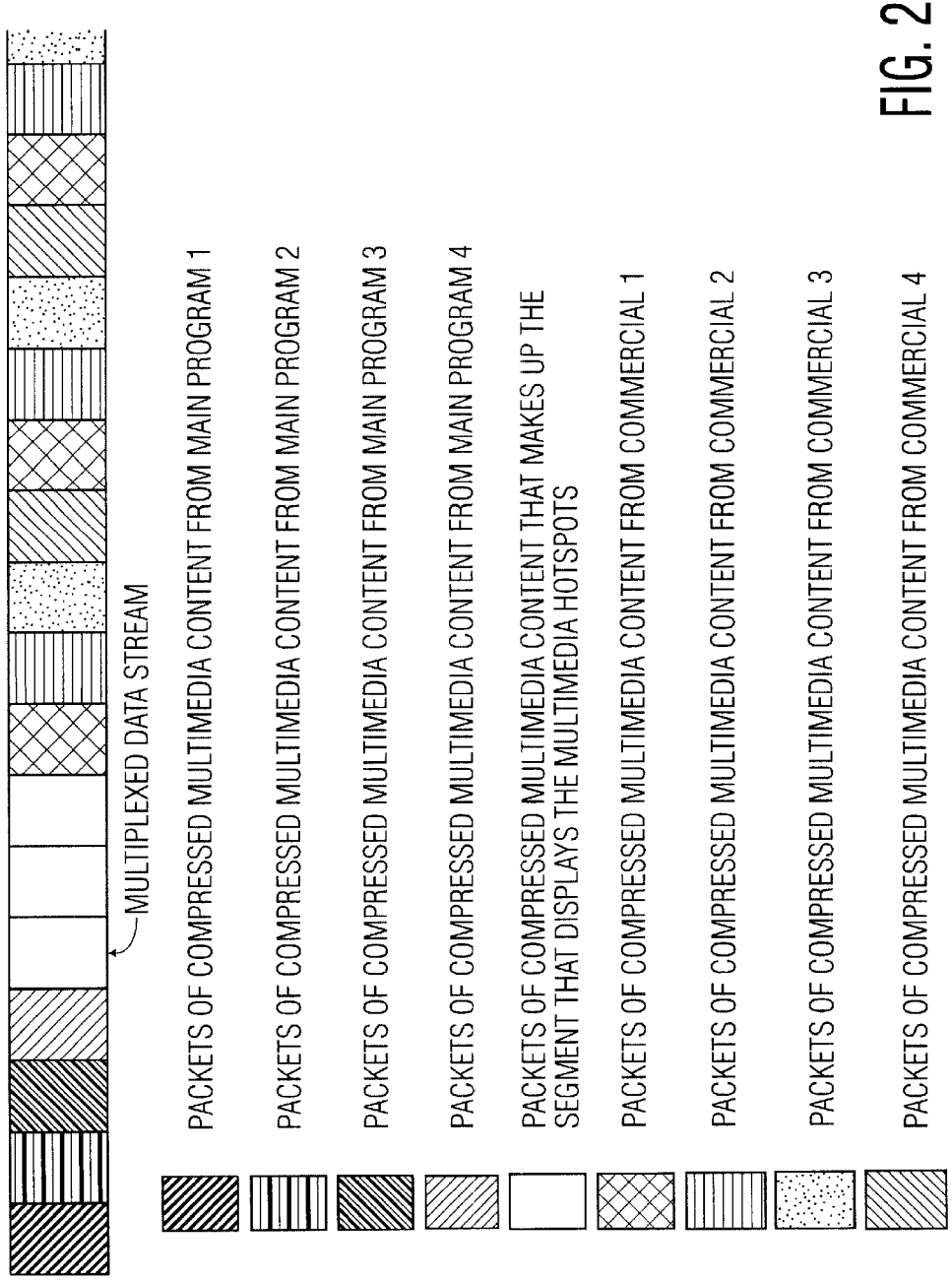
FIG. 2 is a diagram which depicts a multiplexed data stream according to a second preferred embodiment of the present invention; and, FIG. 3 is a block diagram of an illustrative system for implementing the method of the present invention.

In accordance with a second preferred embodiment of the method of the present invention, multiple main programs are multiplexed together and broadcast as a multiplexed data stream over a single broadcast channel, along with the multiplexed stream of packets of compressed multimedia content corresponding to the different commercials, and the packets of multimedia content that together comprise the video segment that displays the menu of multimedia hotspots, as is depicted in FIG. 2. Preferably, all of the main programs have synchronized commercial breaks during which the multimedia hotspots corresponding to the menu of commercial choices will be displayed. The viewer can then select the commercial he/she desires to view in the same manner as described above in connection with the first preferred embodiment of the present invention.

In accordance with a third preferred embodiment of the method of the present invention, an interactive main program (e.g., an interactive television show or movie) is broadcast over a single broadcast channel in multiple pieces or main program segments, with a plurality of different multimedia hotspots being displayed at the end of each main program segment giving the viewer a menu of different possible branches or forks in the main program from which to choose. At each branch point in the main program, the next main program segment which is presented will be determined by the choice made by the viewer. The branching choices can be based on different possible directions of the plot of the main program, or on any other suitable basis.

In the case of the broadcast of a single main program, each commercial packet is preferably provided with a respective Packet Identification (PID) Code or other suitable identification code to enable the commercial packets corresponding to the commercial selected for viewing to be identified and separated from the multiplexed data stream, and then re-assembled. In this connection, the application program in the digital television receiver preferably causes the digital television receiver to de-multiplex the received multiplexed data stream in accordance with the selection made by the viewer, so that the commercial packets comprising the commercial which is selected for viewing can be re-assembled and displayed as a continuous picture on the television screen. For example, the de-multiplexing can be accomplished by switching between the different multiplexed commercial packets by changing the PIDs selected for display by the digital television receiver (i.e., the PIDs to which the digital television receiver is tuned).

The PIDs for the commercial packets comprising each different commercial can be provided in any suitable manner. For example, one possibility is for the PIDs for the commercial packets that comprise each commercial to be broadcast in a private data stream for the application. A second possibility is for each commercial in the broadcast data stream to be provided with a unique program_number, whereby the selection of a particular commercial by clicking on the multimedia hotspot corresponding to the selected commercial will correspond to the selection of a specific program_number associated therewith. The rule for selecting the specific program_number can be based on a default assumption in the application program (e.g., the shortest distance of the selected multimedia from the top left of the display). Each program_number can have an associated file PMT_PID which contains the PIDs of the commercial packets which comprise the corresponding commercial.

In the case of the broadcast of a single main program over the selected broadcast channel, as is depicted in FIG. 1, the video segment (i.e., group of packets) that displays the multimedia hotspots corresponding to the menu of commercial choices will be on the same PIDs as the main program. In the case of the broadcast of multiple main programs over the selected broadcast channel, as is depicted in FIG. 2, the video segment that displays the multimedia hotspots corresponding to) the menu of commercial choices will be on the same PIDs as the main program for every single main program. This can be done by repeating the same segment on all of the PIDs for each of the main programs. If it is desired to conserve bandwidth, the application can be made to fork to a single set of PIDs by changing the content of the PMT_PIDs.

Figure 3:
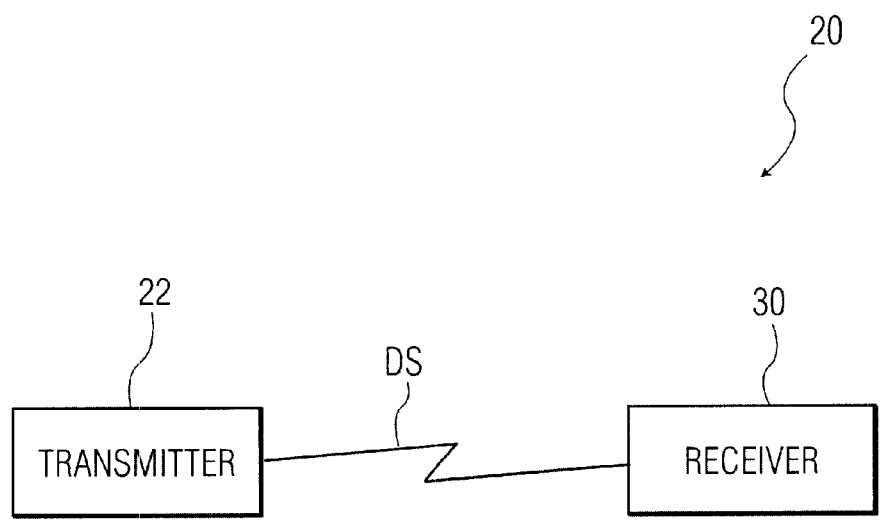

With reference now to FIG. 3, there can be seen an illustrative system 20 for implementing the method of the present invention. The system 20 includes a transmitter 22 (e.g., cable TV broadcast station, DBS satellite, multimedia server, or other source of multimedia program material) which broadcasts a multiplexed data stream DS, e.g., a multiplexed MPEG-encoded multimedia data stream, of one of the types described hereinabove, over a designated broadcast channel via any suitable transmission medium (e.g., air, co-axial cable, or fiber optic cable). The system 20 further includes a receiver 30, e.g. an HDTV or ATSC television receiver, which can be tuned to receive the transmitted multiplexed data stream DS. The digital television receiver 30 is programmed to implement the method of the present invention as described hereinabove (either the first, second, or third preferred embodiment), to thereby allow the viewer a choice of viewing options.

Although presently preferred embodiments of the present invention have been described in detail hereinabove, it should be clearly understood that many variations and/or modifications of the basic inventive concepts herein taught which may appear to those skilled in the pertinent art will still fall within the spirit and scope of the present invention as defined in the appended claims.

For example, although the specific embodiments described hereinabove are especially suitable to a system that uses either the MPEG-2 or ATSC specification for compression-encoding of the video and associated audio data comprising the transmitted data stream, it will be readily apparent to those skilled in the pertinent art that the present invention is equally applicable to systems which use any other suitable multimedia data encoding scheme.

Further, although the present invention has been described as utilizing a digital television receiver, it will be readily apparent that any other suitable device which has the capability of receiving, processing, and displaying encoded multimedia data could likewise be employed. For example, a personal computer (PC) connected via modem to the Internet/World Wide Web (WWW) or to a multimedia server (e.g., one operated by the service provider or broadcaster) could be utilized. Also, a conventional NTSC (or PAL/SECAM) analog television receiver equipped with an appropriate digital set-top box could also be utilized in the practice of the present invention.

Further, it will also be readily appreciated that the operating system may or may not have a return channel. If the return channel is present, it can be in the form of a cable return channel (e.g., in a cable system equipped with upstream cable modems) or a modem connected via a standard telephone line or high-speed data transmission line (e.g., an ISDN or T-1 line) to a multimedia server or to the WWW. If a reverse channel is available, the viewer can choose to directly access material from the server or the WWW, e.g., using a browser program that is resident either on the receiver or on a peripheral device connected to the receiver.

What is claimed is:

1. A receiver configured to receive a multiplexed stream of data packets which includes a main program and a plurality of commercials said commercials having a content, said receiver comprising:
    a display device;
    means for informing a user of said content of said commercials by displaying multi-media hotspots included in the main program; and
    means responsive to a user action for causing said display device to display a selected commercial of the plurality of commercials, said selected commercial being chosen by said user based upon said content.

2. The receiver as set forth in claim 1, wherein said means responsive to a user action comprises:
    a digital signal processor for processing the multiplexed data stream in such a manner as to cause the display device to simultaneously display the multimedia hotspots indicative of respective ones of the plurality of commercials during commercial interruptions in the main program; and,
    a user-operated control device for enabling a user to choose a selected one of the displayed multimedia hotspots by means of the user action, to thereby cause the corresponding commercial to be displayed by the display device.

3. The receiver as set forth in claim 2, wherein the multiplexed data stream includes a plurality of multiplexed main programs.

4. The receiver as set forth in claim 3, wherein all of the main programs have synchronized commercial interruptions during which said plurality of multimedia hotspots are simultaneously displayed.

5. The receiver of claim 1, wherein the multiplexed data stream is comprised of a multiplexed stream of first and second types of data packets, said first type of packets comprising packets of compressed multimedia content corresponding to the main program and the multimedia hotspots, said second type of packets comprising packets of compressed multimedia content corresponding to the commercials.

6. The receiver as set forth in claim 1, wherein the user action comprises pointing and clicking on the multimedia hotspot using a cursor-type control device.

7. The receiver ads set forth in claim 5, wherein:
    at least said second types of packets have packet identification codes associated therewith; and,
    said digital signal processor switches between different ones of said second packets by changing said packet identification code to which the receiver is tuned.

8. The receiver as set forth in claim 1, wherein the receiver comprises a digital television receiver.

9. The receiver as set forth in claim 1, wherein the receiver comprises an analog television receiver equipped with a digital set-top box.

10. The receiver as set forth in claim 1, wherein the multiplexed data stream comprises an MPEG-encoded multimedia data stream.

11. The receiver as set forth in claim 1, wherein the multiplexed data stream comprises an ATSC-encoded multimedia data stream.

12. A receiver configured to receive a multiplexed stream of data packets which includes an interactive main program comprised of a plurality of main program segments including at least a first main program segment and a plurality of second main program segments each second main program segment having a content, the receiver comprising:
   a display device;
   means for informing a user of said content of said second main program segments by displaying multi-media hotspots included in the first main program segment; and
   means responsive to a user action for causing said display device to display a selected second main program segment of the plurality of second main program segments, said selected second main program segment being chosen by said user based upon said content.

13. The receiver as set forth in claim 12, wherein said means responsive to a user action comprises:
   a digital signal processor for processing the multiplexed data stream in such a manner as to cause the display device to simultaneously display the multimedia hotspots indicative of respective ones of the plurality of second main program segments at the conclusion of the first main program segment; and,
   a user-operated control device for enabling a user to choose a selected one of the displayed multimedia hotspots by means of the user action, to thereby cause the corresponding one of the second main program segments to be displayed by the display device.

14. A receiver configured to receive a multiplexed stream of data packets which includes an interactive main program comprised of a plurality of main program segments including at least a first main program segment and a plurality of second main program segments each second main program segment having a content, the receiver comprising:
   a display device;
   means for informing a user of said content of said second main program segments by displaying multi-media hotspots included in the first main program segment; and
   means responsive to a user action for causing said display device to branch to a selected second main program segment of the plurality of second main program segments at a branching point of the first main program segment, said selected second main program segment being chosen by said user based upon said content.

15. A system, comprising:
   a transmitter for transmitting a multiplexed stream of data packets which includes a main program and a plurality of commercials, said commercials each having a content;
   a receiver configured to receive said multiplexed data stream, said receiver including a display device and means for informing a user of said content of said commercials by displaying multi-media hotspots included in the main program; and
   said receiver further including means responsive to a user action for causing said display device to display a selected commercial of the plurality of commercials, said selected commercial being chosen by said user based upon said content.

16. The system as set forth in claim 15, wherein said multiplexed data stream is transmitted over a broadcast channel.

17. The system as set forth in claim 15, wherein said means responsive to a user action comprises:
   a digital signal processor for processing said multiplexed data stream in such a manner as to cause the display device to simultaneously display the multimedia hotspots indicative of respective ones of the plurality of commercials during commercial interruptions in the main program; and,
   a user-operated control device for enabling a user to choose a selected one of the displayed multimedia hotspots by means of the user action, to thereby cause the corresponding commercial to be displayed by the display device.

18. The system of claim 17, wherein said multiplexed data stream is comprised of a multiplexed stream of first and second types of data packets, said first type of packets comprising packets of compressed multimedia content corresponding to the main program and the multimedia hotspots, said second type of packets comprising packets of compressed multimedia content corresponding to the commercials.

19. The system as set forth in claim 17, wherein said multiplexed data stream includes a plurality of multiplexed main programs.

20. The system as set forth in claim 19, wherein all of the main programs have synchronized commercial interruptions during which said plurality of multimedia hotspots are simultaneously displayed.

21. A system, comprising:
   a transmitter for transmitting a multiplexed stream of data packets which includes an interactive main program comprised of a plurality of main program segments including at least a first main program segment and a plurality of second main program segments, said second main program segments each having a content;
   a receiver having a display device and means for informing a user of said content by displaying multi-media hotspots included in the first main program segment;
   said receiver further having means responsive to a user action for causing said interactive main program to branch to a selected second main program segment of the plurality of second main program segments at a branching point of the first main program segment, said selected second main program segment being chosen by said user based upon said content.

22. The system as set forth in claim 21, wherein said multiplexed data stream is transmitted over a broadcast channel.

23. The system as set forth in claim 21, wherein said means responsive to a user action comprises:
   a digital signal processor for processing said multiplexed data stream in such a manner as to cause the display device to simultaneously display the multimedia hotspots indicative of respective ones of the plurality of second main program segments at the conclusion of the first main program segment; and,
   a user-operated control device for enabling a user to choose a selected one of the displayed multimedia hotspots by means of the user action, to thereby cause the corresponding one of the second main program segments to be displayed by the display device.

24. A method for implementing an interactive program, comprising the steps of:
   receiving a multiplexed stream of data packets which includes a main program and a plurality of commercials, said commercials each having a content;

informing a user of said content by displaying multimedia hotspots included in the main program; and displaying a selected commercial of the plurality of commercials, said selected commercial being chosen by said user based upon said content.

25. The method as set forth in claim 24, wherein the step of displaying is carried out by simultaneously displaying the multimedia hotspots indicative of respective ones of the plurality of commercials during commercial interruptions in the main program, and then displaying the selected commercial of the plurality of commercials in response to the user selecting a corresponding one of the multimedia hotspots.

26. The method as set forth in claim 24, wherein the multiplexed data stream is received over a broadcast channel.

27. A method for implementing an interactive program, comprising the steps of:

transmitting a multiplexed stream of data packets which includes a main program and a plurality of commercials, said commercials having a content;

receiving said multiplexed data stream;

informing a user of said content by displaying multimedia hotspots included in the main program; and, displaying a selected commercial of the plurality of commercials during a commercial interruption in the main program, said selected commercial being chosen by said user based upon said content.

28. The method as set forth in claim 27, wherein said multiplexed data stream is transmitted and received over a broadcast channel.

29. A method for implementing an interactive program, comprising the steps of:

receiving a multiplexed stream of data packets which includes an interactive main program comprised of a plurality of main program segments including at least a first main program segment and a plurality of second main program segments, said second main program segments each having a content;

informing a user of said content by displaying multimedia hotspots included in the first main program segment; and, branching to a selected second main program segment of the plurality of second main program segments at a branching point of the first main program segment, said selected second main program segment being chosen by said user based upon said content.

30. The method as set forth in claim 29, wherein the step of displaying is carried out by simultaneously displaying the multimedia hotspots indicative of respective ones of the plurality of second main program segments at the conclusion of the first main program segment and then branching to the selected second main program segment of the plurality of different second main program segments in response to the user selecting a corresponding one of the multimedia hotspots.

31. The method as set forth in claim 29, wherein said multiplexed data stream is received over a broadcast channel.

32. A method for implementing an interactive program, comprising the steps of:

transmitting a multiplexed stream of data packets which includes an interactive main program comprised of a plurality of main program segments, said main program segments including at least a first main program segment and a plurality of second main program segments, said second main program segments each having a content;

receiving said multiplexed data stream;

informing a user of said content by displaying multimedia hotspots included in the first main program segment; and, branching to a selected segment of the plurality of second main program segments at a branching point of the first main program segment said selected segment being chosen by said user based upon said content.

33. The method as set forth in claim 32, wherein the step of displaying is carried out by simultaneously displaying the multimedia hotspots indicative of respective ones of the plurality of second main program segments at the conclusion of the first main program segment and then branching to the selected segment of the plurality of second main program segments in response to the user selecting a corresponding one of the multimedia hotspots.

34. The method as set forth in claim 32, wherein said multiplexed data stream is transmitted and received over a broadcast channel.

* * * * *